(12) United States Patent
Kuntz et al.

(10) Patent No.: US 11,247,418 B2
(45) Date of Patent: Feb. 15, 2022

(54) DEVICE AND METHOD FOR PRODUCING A CURVED FIBER PREFORM FROM A BI-OR MULTIDIRECTIONAL FIBER SEMI-FINISHED PRODUCT

(71) Applicant: PREMIUM AEROTEC GMBH, Augsburg (DE)

(72) Inventors: Julian Kuntz, Augsburg (DE); Ralph Männich, Aichach (DE); Enzo de Santis Mühlberger, Augsburg (DE); Francois Tremblay, Augsburg (DE); Margarita Wanner, Friedberg (DE); Christoph Stehncken, Uslar (DE)

(73) Assignee: Premium Aerotec GmbH, Augsburg (DE)

( * ) Notice: Subject to any disclaimer, the term of this patent is extended or adjusted under 35 U.S.C. 154(b) by 179 days.

(21) Appl. No.: 16/045,328

(22) Filed: Jul. 25, 2018

(65) Prior Publication Data
US 2019/0030841 A1    Jan. 31, 2019

(30) Foreign Application Priority Data
Jul. 26, 2017 (DE) ...................... 10 2017 212 860.7

(51) Int. Cl.
*B29C 70/54* (2006.01)
*B29C 70/68* (2006.01)
(Continued)

(52) U.S. Cl.
CPC ............ *B29C 70/682* (2013.01); *B29B 11/16* (2013.01); *B29C 53/04* (2013.01); *B29C 53/06* (2013.01);
(Continued)

(58) Field of Classification Search
CPC ....... B29C 70/682; B29C 53/04; B29C 53/06; B29C 66/1122; B29C 70/545;
(Continued)

(56) References Cited

U.S. PATENT DOCUMENTS 4,573,304 A * 3/1986 Mieyal ...................... B32B 3/04
52/793.11
4,720,255 A 1/1988 Mittelstadt
(Continued)

FOREIGN PATENT DOCUMENTS

| CN | 209257270 U | 8/2019 |
| DE | 34 42 509 A1 | 6/1985 |

(Continued)

OTHER PUBLICATIONS

German Office Action for German Application No. 10 2017 212 860.7 dated Sep. 28, 2018.
(Continued)

*Primary Examiner* — Jeffrey M Wollschlager
*Assistant Examiner* — Shibin Liang
(74) *Attorney, Agent, or Firm* — Jenkins, Wilson, Taylor & Hunt, P.A.

(57) ABSTRACT

A device for producing a curved fiber preform from a bi- or multidirectional fiber semi-finished product, in particular for an aircraft or spacecraft fuselage component has first lamellae and second lamellae formed to be couplable to one another criss-cross such that they are positioned on a shared plane and thus form a grid. The lamellae at least in part are formed resiliently bendable about an axis intersecting the shared plane such that a local orientation of the lamellae in the grid changes. An adhesion device or structure is formed for temporarily adhering the fiber semi-finished product and
(Continued)

is configured such that the local fiber orientation of the fiber semi-finished product also changes accordingly when the lamellae bend.

20 Claims, 6 Drawing Sheets

(51) Int. Cl.
| | |
|---|---|
| *B29B 11/16* | (2006.01) |
| *B29C 53/04* | (2006.01) |
| *B29C 53/06* | (2006.01) |
| *B29C 65/00* | (2006.01) |
| *B29C 70/56* | (2006.01) |
| *B29C 70/74* | (2006.01) |
| *B29L 31/00* | (2006.01) |
| *B29K 101/12* | (2006.01) |
| *B29K 105/08* | (2006.01) |
| *B29K 307/04* | (2006.01) |
| *B29L 31/30* | (2006.01) |

(52) U.S. Cl.
CPC ........ B29C 66/1122 (2013.01); B29C 70/545 (2013.01); B29C 70/56 (2013.01); B29C 70/742 (2013.01); *B29K 2101/12* (2013.01); *B29K 2105/0881* (2013.01); *B29K 2307/04* (2013.01); *B29L 2031/3082* (2013.01); *B29L 2031/7739* (2013.01)

(58) Field of Classification Search
CPC ....... B29C 70/56; B29C 70/742; B29B 11/16; B29K 2101/12; B29K 2105/0881; B29K 2307/04; B29L 2031/3082; B29L 2031/7739
See application file for complete search history.

(56) References Cited

U.S. PATENT DOCUMENTS

| | | | |
|---|---|---|---|
| 5,981,023 | A | 11/1999 | Tozuka et al. |
| 7,972,129 | B2 * | 7/2011 | O'Donoghue .......... B29C 33/40 425/388 |
| 2011/0086199 | A1 * | 4/2011 | Duqueine ............. B29C 70/446 428/112 |
| 2012/0086150 | A1 * | 4/2012 | De Mattia ............... B29C 70/32 264/310 |
| 2014/0027048 | A1 | 1/2014 | Hawkins et al. |
| 2015/0266260 | A1 | 9/2015 | Fujioka et al. |
| 2015/0361612 | A1 | 12/2015 | Fouquet et al. |

FOREIGN PATENT DOCUMENTS

| | | | | |
|---|---|---|---|---|
| DE | 696 10 666 T2 | | 5/2001 | |
| DE | 10 2011 002 906 A1 | | 7/2012 | |
| DE | 102011002906 | * | 7/2012 | ............. B29C 70/54 |
| DE | 10 2011 119 220 A1 | | 5/2013 | |
| DE | 10 2013 202 571 A1 | | 8/2014 | |
| DE | 20 2013 101 050 U1 | | 8/2014 | |
| DE | 102013208778 | * | 11/2014 | ............. B25J 15/00 |
| DE | 10 2013 202 571 B4 | | 5/2016 | |
| EP | 1 057 616 A1 | | 12/2000 | |
| EP | 2 392 714 A1 | | 12/2011 | |
| EP | 2 767 371 A1 | | 8/2014 | |
| EP | 3 434 436 B1 | | 12/2019 | |
| FR | 2 935 107 A1 | | 2/2010 | |
| JP | H11-78874 A | | 3/1999 | |
| JP | 2019055585 A | | 4/2019 | |
| WO | WO 2014/139938 A1 | | 9/2014 | |

OTHER PUBLICATIONS

European Search Report for Application No. 18180081.4 dated Jan. 2, 2019.

* cited by examiner

DEVICE AND METHOD FOR PRODUCING A CURVED FIBER PREFORM FROM A BI-OR MULTIDIRECTIONAL FIBER SEMI-FINISHED PRODUCT

CROSS-REFERENCE TO RELATED APPLICATION

This application claims priority to German patent application DE 10 2017 212 860.7 filed Jul. 26, 2017, the entire disclosure of which is incorporated by reference herein.

TECHNICAL FIELD

The disclosure herein relates to a device for producing a curved fiber preform from a bi- or multidirectional fiber semi-finished product and to a corresponding method for producing a curved fiber preform from a bi- or multidirectional fiber semi-finished product.

Although the disclosure herein is described in greater detail hereinafter in relation to fiber preforms, also generally referred to as preforms, for former structures of an aircraft or spacecraft, it is not limited thereto but rather is transferable to various curved fiber preforms, in particular for fuselage components of an aircraft or spacecraft.

BACKGROUND

For producing former structures, textile blanks of a bi- or multidirectional fiber semi-finished product are draped onto the desired former shape. The draping is currently usually carried out by hand. A necessary step in this context is the production of the former-specific curvature so as to obtain a curved fiber preform. For this purpose, shearing and/or deformation of the fiber semi-finished product are generally required. Further, adaptation to the precise shape of each individual component to be produced is also carried out, in particular subsequently.

DE 10 2011 119 220 A1 describes devices for producing curved components from a fiber composite material.

SUMMARY

Against this background, one of the ideas of the disclosure herein is to provide an improved device for manufacturing a curved fiber preform from a bi- or multidirectional fiber semi-finished product which makes simplified and in particular automatable manufacture possible.

Accordingly, a device for producing a curved fiber preform from a bi- or multidirectional fiber semi-finished product, in particular for a fuselage component of an aircraft or spacecraft, is provided, comprising a plurality of first lamellae and a plurality of second lamellae which are formed to be couplable to one another, in particular pluggable into one another, criss-cross in such a way that they are positioned on a shared plane and thus form a grid, the lamellae at least in part being formed resiliently bendable about an axis intersecting the shared plane in such a way that a local orientation of the lamellae in the grid changes, in particular continuously; and an adhesion device or structure which is formed for temporarily adhering the fiber semi-finished product to the grid and is configured in such a way that the local fiber orientation of the fiber semi-finished product also changes accordingly when the lamellae bend.

Further, a method for producing a curved fiber preform, in particular by a device according to the disclosure herein, is provided, comprising the following method steps: applying a bi- or multi-directional fiber semi-finished product to a grid of a plurality of first lamellae and a plurality of second lamellae, which are coupled to one another, in particular plugged into one another, criss-cross and positioned on a shared plane, temporarily adhering the fiber semi-finished product to the grid; and resiliently bending the lamellae at least in part about an axis intersecting the shared plane, a local orientation of the lamellae in the grid changing, in particular continuously, and a local fiber orientation of the fiber semi-finished product also changing accordingly when the lamellae bend.

An idea behind the disclosure herein is to provide a deformation of a grid serving as a carrier structure for the fiber semi-finished product in a manner corresponding to the desired deformation of the fiber semi-finished product. For this purpose, the lamellae of the grid are formed and oriented as exactly as possible in accordance with the orientation of the fibers contained in the fiber semi-finished product, in such a way that a shared orientation of the lamellae and fibers, which can be deformed jointly, is provided. The lamellae and fibers thus deform in the same manner during the bending. Advantageously, in this way a curved fiber orientation of the curved fiber preform is very precisely adjustable or controllable, in such a way that the quality of the fiber preform and thus also of the fuselage component to be produced is improved, in particular in terms of mechanical properties.

Advantageously, in particular the deformation of a silicone core used in previous devices is further avoided, the deformation of the core not geometrically corresponding to a shear deformation of a fiber semi-finished product.

Further, the shaping principle according to the disclosure herein makes greatly simplified automation of the process possible, as well as greatly improved reproducibility of the shaping. In this way, reduction in staffing costs and acceleration of the production process can be achieved.

By a device or method according to the disclosure herein, in particular curved fiber preforms for C profiles or Z profiles of formers can be produced. In this way, portions of a former, for example portions of a former curved through 90°, can be produced in an automated manner and with greater reproducibility using fiber preforms correspondingly curved through 90°. Subsequently, they can also be shaped into the desired profile, for example a C profile or Z profile.

The lamellae being on a shared plane should be understood to mean that they provide a shared grid face when coupled, in particular plugged into one another. This may also merely be a shared local plane, in such a way that arched shared grid surfaces, for example for manufacturing multiple curved components, are also conceivable. The surface of the grid may therefore also imitate a three-dimensionally curved surface. For example, for this purpose the lamellae may be formed at different heights in different regions of the grid, and thus be provided adapted to a desired component shape.

Further, thin lamellae, in particular in the form of rods, would also be conceivable at least in portions, in such a way that they can bend in not just one but a plurality of directions. In this way, three-dimensional bendings are also possible. Accordingly, the grid can also be shaped to a three-dimensional shape and/or itself deform three-dimensionally as a result of bending of the lamellae.

Bending at least in part about an axis intersecting the shared plane should thus be understood to mean that the bending axis may be oriented perpendicular to the grid or else at an angle to portions of the grid or to the entire grid. The point of intersection between the axis and the shared plane need not and indeed generally will not lie within the grid, but rather in an imaginary continuation of the grid in the plane thereof.

As well as continuously bendable lamellae, for example a grid would also be conceivable which comprises lamellae consisting of or comprising a plurality of short lamellar pieces which are connected using rotary joints. The individual lamellar pieces would therefore remain straight in spite of the bending of the lamellae as a whole, and the deformation would be implemented at the rotary joints.

Adhesion of the fiber semi-finished product to the grid should be understood to mean that there is static friction between the fiber semi-finished product and the grid. This may, but need not necessarily, act directly between the grid and the fiber semi-finished product, and instead may optionally also be transmitted via an intermediate layer, for example a membrane arranged in between.

In particular, an additional advantage of the disclosure herein is the particularly simple possibility of automation of shaping steps for curved fiber preforms which were previously usually carried out manually.

An adhesion device should be understood to mean, for example, an individual device or measure or a combination thereof which leads to adhesion of the semi-finished product to a surface of the grid which is sufficient for the desired deformation during bending of the lamellae. This can be configured in various ways. In a simple embodiment, the adhesion device or structure may be formed as a bonding of the grid itself or as a soluble adhesion promoter applied thereto. For example, for this purpose sticky, rough, jagged and/or needle portions may be provided in an application region, provided on the grid, which is non-critical for the fiber semi-finished product, for example at an edge of the fiber semi-finished product. In further embodiments, an adhesion device or structure may contain structures or measures provided externally to the grid, for example on the basis of underpressure for sucking the fiber semi-finished product on or of mechanical pressure for pressing the fiber semi-finished product on.

For example, the fiber semi-finished product is applied to or oriented on the grid in such a way that the fibers at least in part extend parallel to the lamellae. For example, ±45° fibers of a fiber roving are oriented along the ±45° lamellae of the grid.

The fiber semi-finished product to be deformed for producing the curved fiber preform is in particular formed as a ±45° biaxial roving or as a ±45°, 90° triaxial roving. In this case, the lamellae of the grid may also extend at ±45° angles. In particular, the fiber semi-finished product does not contain any 0° fibers, which would prevent stretching or compression of the roving.

During bending of the lamellae, the lamellae deform in a manner corresponding to a desired progression of the fibers in the curved state. The fibers of the fiber semi-finished product or fiber roving therefore deform in a desired manner during the deformation of the cells of the grid, in such a way that the fiber direction is ideally locally reoriented in a manner corresponding to the deformation.

In particular, cells which are positioned radially externally, in other words outside a neutral fiber, of a grid having ±45° lamellae, which form rectangular, for example square cells of the grid before the bending, are stretched to form rhombuses which are elongate in the peripheral direction. Thus, even radially externally positioned ±45° fibers, for example of a ±45° biaxial roving, are sheared or reoriented in such a way that they cross in the manner of elongate rhombuses. Conversely, radially internal cells of the grid are compressed to form rhombuses which are squashed in the peripheral direction, and this in the same manner leads to corresponding reorientation or shearing of the fibers. In this way, in particular radial fanning out of the ±45° fibers or of the fiber directions thereof is achieved.

In the case of a ±45°, 90° triaxial roving, in this context the 90° fibers would for example also be displaced radially in a manner corresponding to the deformation. The 90° fiber layers would thus slide with respect to the ±45°. The orientation of the grid would thus correspond to the orientation of the ±45° layers, the orientation of the 90° layer not being imitated by the grid.

In further embodiments, it would also be conceivable to provide a 0°, 90° biaxial roving. In this case, the lamellae may also extend at 0° and 90° angles. Thus, the 90° lamellae and fibers, in particular exclusively, would fan out radially during the bending of the lamellae, and the 0° fibers would merely be radially displaced.

A suitable orientation of the lamellae in the grid is thus dependent in particular on the fiber orientation of the fiber semi-finished product to be shaped, and may be unidirectional for this purpose.

Naturally, in each case multidimensional rovings having fiber directions and any further fiber directions would also be conceivable, as long as the fiber layers which are not oriented parallel to the grid bars are applied in the textile in such a way that they can slide relative to the other layers during deformation/shearing (for example by way of an active pattern having relatively slack thread tension in a multiaxial roving), in such a way that none of the fiber directions directly obstructs the deformation. By contrast, for example a 0° fiber direction in a ±45° grid would obstruct deformation if it were knitted onto the remaining ±45° layers in such a way that it could not slide.

After the deformation or curvature, the fiber preform can be processed further to form the desired component, for example by cutting off edge regions of the fiber preform and/or by further deformation to form the subsequent component shape, for example collaring the flange of a C profile for producing a former portion and/or connection to further, already deposited component layers and/or curing a binder.

In a development, for coupling to one another the first and second lamellae may comprise corresponding plug sockets which can be plugged into one another. In particular, the plug sockets combine to form a depth corresponding to a thickness of the first and/or second lamellae. In particular, the plug sockets are formed as slits. For example, the slits extend from a longitudinal face in each case approximately as far as the centre of a lamella. For example, at the base of a slit a detensioning hole may be provided to prevent grooving effects which occur during bending.

In a further embodiment, a neutral lamella is introduced into the grid, and is arranged in the region of a theoretical or actual neutral fiber of the curved fiber preform to be produced. In particular, this is an irregular lamella, i.e. one arranged so as to interrupt the regular arrangement of the lamellae in the grid. For example, this neutral lamella extends at a 0° orientation, in other words in the peripheral direction when the lamellae are bent. The neutral lamella is formed in such a way that cells of the grid which are positioned on a first side of the neutral lamella are stretched, in particular in relation to a reference direction, during bending, and cells of the grid which are positioned on a second side of the neutral lamella are compressed, in particular in relation to an identical reference direction, during bending. In particular, cells positioned directly on the neutral lamella are only insignificantly deformed in accordance with the bending. Advantageously, the shaping can thus be provided in a predefined manner.

The stretching and compression may be each to be understood in the peripheral direction. Accordingly, the side lengths of the individual cells remain constant. Since the plug connections are formed stationary with respect to the lamellae, a stretched cell is therefore stretched in the peripheral direction and compressed in the radial direction, whilst a compressed cell is compressed in the peripheral direction and stretched in the radial direction. When the cells shear, they are therefore always stretched in one direction and shortened in another direction perpendicular thereto. The peripheral direction therefore forms the reference direction in this case.

A stationary positioning of the plug connections with respect to the lamellae is advantageous since the fibers of the unshaped textile semi-finished product itself are thus not compressed or stretched but merely reoriented or bent and sheared with respect to one another.

For example, for being received in the grid, the neutral lamella may likewise be provided with plug sockets. Accordingly, in regions in which the neutral lamella is to be inserted, the lamellae of the grid are likewise formed with additional plug sockets for receiving the neutral lamella.

In one embodiment, a deformable membrane provided as a support face for the fiber semi-finished product is provided on the grid. In this manner, swellings of the fiber semi-finished product into the cavities of the cells or gaps in the lamellae are effectively prevented. It is additionally conceivable to provide the membrane as a grid fabric, for example a wire grid, which is deformable in the same way as the fibers. In particular, however, the membrane may also be formed as a membrane which is resiliently biased to compensate the bending of the lamellae. For example, it may contain an elastomer for this purpose. In a further embodiment, this may for example be a resilient perforated or slitted (rubber or elastomer) membrane. In particular, it may be biased, for example counter to the desired bending direction. In particular, the membrane may be biased on the side of the neutral fiber which experiences compression in the peripheral direction during the bending process, in such a way that after the bending process is carried out it is actually detensioned or still slightly biased. In this way, the deformation of the membrane occurring when the lamellae are bent is compensated, in such a way that no corrugations or folds are raised and swelling into the cavity of the cells of the grid is also prevented.

In a further embodiment, the adhesion device or structure comprises an underpressure box which fluidically contacts the grid. The underpressure box is formed in such a way that an underpressure can thus be applied in each cell of the grid provided for supporting the fiber semi-finished product. In particular, for this purpose an underpressure connection, to which an underpressure source can be connected, is provided on the underpressure box. Advantageously, in this way the fiber semi-finished product is sucked onto the grid and the adhesions to the grid which are desired for the deformation are thus provided.

In a development, the underpressure box is perforated in the region of cells of the grid which are provided for supporting the fibers. Sealing for in particular locally sealing the perforation and/or the grid are further provided in regions without fiber semi-finished product support, in other words in regions where the fiber semi-finished product is not currently being supported and/or in edge regions of the fiber semi-finished product. For example, in this way, at the edge of the fiber semi-finished product, cells of the grid which are merely half-covered by the fiber semi-finished product can also be sealed. In this way, it is provided that an underpressure is present substantially at the fiber semi-finished product. Advantageously, in this way the underpressure is merely transmitted to the required points on the grid. This means that the fiber semi-finished product itself is basically adhered to the grid not by the sealing but rather by the underpressure, although naturally there may also be a slight adhesion due to the sealing on the covered edge.

In one embodiment, the entire grid may be flooded with underpressure. For this purpose, the individual cells of the grid may be formed fluidically connected via corresponding holes in the lamellae.

In further embodiments, it would also be conceivable merely to apply underpressure to the currently required cells of the grid. For example, for this purpose the cells may each have their own activatable and deactivatable underpressure supply opening.

The grid and/or the underpressure box may also be anti-adhesively coated, making it possible to bend the grid on the underpressure box without resistance.

Further, a wide range of sealing or sealing structures are conceivable. For example, they may be one or more cover films or cover plates which locally seal the holes of the perforation. However, controllable flat slides or valves, for example magnetic valves, are also conceivable as a sealing which can open and close individual ones of or groups of openings of the perforation for underpressure supply.

In a further embodiment, the perforation of the underpressure box is provided in a first region, where the cells of the grid which are provided for supporting the fiber semi-finished product are located when the lamellae are detensioned or not bent, and in a second region, where the cells of the grid which are provided for supporting the fiber semi-finished product are located when the lamellae are bent. This has the advantage that in this way an ideal application of pressure is made possible in both states and also in any intermediate states of the grid.

In a development, the sealing seals the perforation which is positioned alongside the cells of the grid which are provided for supporting the fiber semi-finished product in each state of the grid. Advantageously, the perforation is thus selectively sealed in the regions not required for applying the underpressure in each case, depending on the state of the grid. In this way, distribution of the underpressure to the openings of the perforation which are required in each case is provided.

In one embodiment, the sealing comprises an air-impermeable local covering of the perforation and/or of the grid. Advantageously, a covering of this type provides a sealing which is particularly simple to implement and which is additionally flexibly usable and displaceable. As a result, in particular adaptation to the various states of the grid can also be implemented in a simple manner. For example, a film may be applied over the regions of the perforation and if applicable of the grid which are not required, and be advanced in accordance with the deformation when the lamellae are bent. In particular, the covering may be a flexible film. The advantage of a flexible film of this type is that in this way the device is also easily adjustable to different component sizes or shapes, since the covering can thus seal different contours of a fiber semi-finished product. As a further possibility, the film could consist of or comprise a plurality of overlapping pieces, in such a way that the required movement takes place at the overlapping joints.

Alternatively or in addition, the sealing may comprise selectively actuable valves of the perforation and/or of the grid. For example, these may be valves which are actuable electronically for opening and closing, for example magnetic valves, which are introduced into the openings of the perforation.

In one embodiment, the adhesion device or structure comprises a bonding of the grid itself. For example, a bonding may be provided in the form of sticky, rough, jagged and/or needle portions in an application region, provided on the grid, which is non-critical for the fiber semi-finished product, for example at an edge of the fiber semi-finished product. Force transmission from the grid to the semi-finished product is thus improved, and slipping is additionally prevented.

In a further embodiment, the adhesion device or structure comprises a contact face which contacts the fiber semi-finished product on a side opposite the grid. A coefficient of friction between the contact face and the fiber semi-finished product is configured to be less than a coefficient of friction between the grid and the fiber semi-finished product. Naturally, this also applies to the coefficient of friction between a grid, any membrane connected in between, and the fiber semi-finished product. It is advantageous that in this way particularly simple construction and control of the adhesion device or structure are made possible. The contact face may for example be formed as a stamp which covers the size of the grid in both states, which is for example in the form of a solid body plate, and which has an anti-adhesive coating, for example containing polytetrafluoroethylene or another coating agent having an anti-adhesive effect, on the surface thereof. Alternatively, a very smooth surface having a low coefficient of friction and a high wear resistance may be provided, such as glass or polished high-grade steel. On an opposite side of the grid, in particular a bracing, for example a suitable planar bed, for example also anti-adhesively coated, is provided.

An embodiment having a heatable configuration of the stamp for activating a binder in the deformed state is also conceivable. Heating may be provided before the transport step or after the transport step before the fixing is released. Locally limited heating may be provided in this context.

Further, a rotated arrangement is also possible, in such a way that the contact face serves as a base plate and initially the fiber semi-finished product and subsequently the grid are applied to the contact face.

In a further embodiment, the grid and/or the adhesion device or structure are formed as part of an end effector for transporting the previously curved fiber preform in the bent state of the lamellae. In this way, a particular synergy is produced, since no additional handover to an end effector is required. Further, in this way the component can be transferred to the location of use thereof or to a further shaping device in the predetermined shaped or curved configuration.

For example, in one embodiment, for this purpose the entire device may be rotated after the shaping, in such a way that the bent grid can be raised together with the deformed fiber semi-finished product.

In a further embodiment, the grid is already provided positioned above for shaping, in other words applied to the fiber semi-finished product from above for deformation. In this case, for example a suitable underlay having a low coefficient of friction is provided for bracing the underside of the fiber semi-finished product. In the case of a bonding device based on underpressure, this underlay may be formed air-permeable.

In an embodiment of the method for producing a curved fiber preform, the fiber semi-finished product is oriented in such a way on the grid that the bi- or multidirectional fibers of the fiber semi-finished product extend parallel to the lamellae at least in part.

Further, in an embodiment of the method, alternatively or in addition, a theoretical or actual neutral fiber of the fiber semi-finished product is arranged and oriented on an in particular irregular, neutral lamella of the grid. During the resilient bending, fibers positioned on the first side of the neutral lamella are thus deformed in accordance with a stretching of the cells of the grid which acts there, in particular in relation to a reference direction. Further, fibers positioned on a second side of the neutral lamella deform in accordance with a compression of the cells of the grid which acts there, in particular in relation to an identical reference direction.

Further, in an embodiment of the method, the temporary adhesion is provided by mechanical pressure acting on the fiber semi-finished product or fluidic underpressure acting on the fiber semi-finished product.

Finally, in an embodiment of the method according to the disclosure herein, a step of transporting the curved fiber preform by the grid when the lamellae are bent and/or by an adhesion device or structure used for adhesion is provided.

Alternatively or in addition, in one embodiment, before a step of transporting the curved fiber preform, a handover to a separate end effector may also be performed, which is carried out in such a way that detensioning and reverse deformation of the fiber preform in the meantime are prevented.

In a further embodiment, a further shaping step or a plurality of further shaping steps follow the step of transporting the curved fiber preform. For example, shaping may be provided in a further plane to produce a desired profile cross section, in particular a C or Z profile.

The above embodiments and developments may, within reason, be combined with one another in any desired manner. In particular, all features and devices and processes of the device according to the disclosure herein are transferable to the method according to the disclosure herein and vice versa. Further possible configurations, developments and implementations of the disclosure herein also include combinations not explicitly mentioned of features of the disclosure herein which are described above or hereinafter in relation to the embodiments. In particular, a person skilled in the art will also add individual aspects to each basic form of the disclosure herein as improvements or supplements.

BRIEF DESCRIPTION OF THE DRAWINGS

Hereinafter, the disclosure herein is described in greater detail by way of the embodiments set out in the schematic and example drawings, in which.

Figure 1:
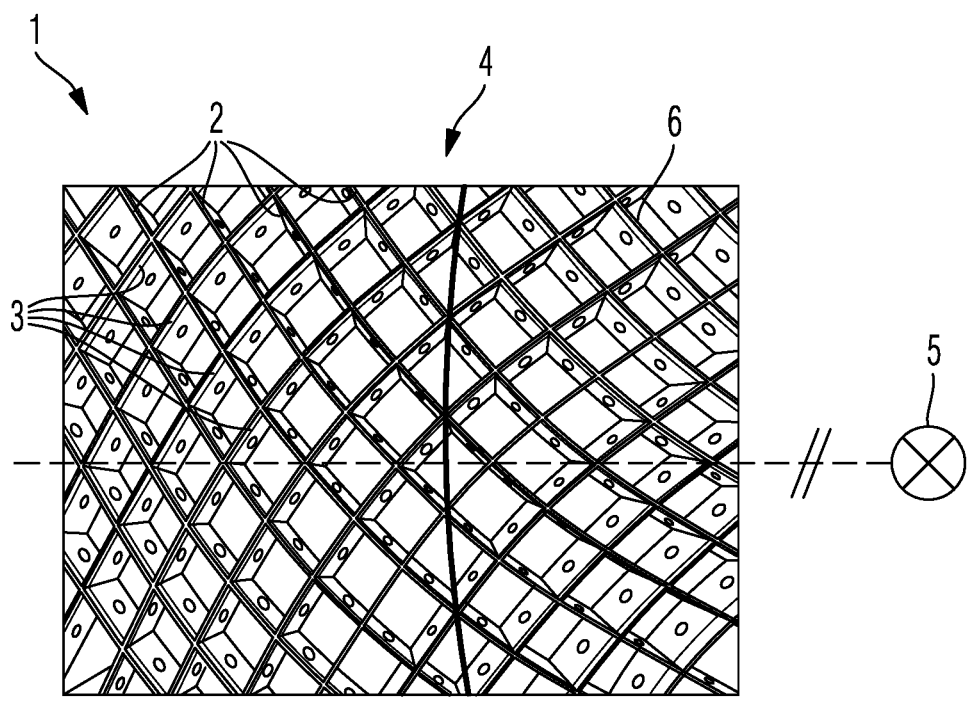
FIG. 1 is a plan view of a portion of a device for producing a curved fiber preform.

The accompanying drawings are intended to convey an improved understanding of the embodiments of the disclosure herein. They illustrate embodiments and serve in conjunction with the description to explain principles and concepts of the disclosure herein. Other embodiments and many of the stated advantages may be derived from the drawings. The elements of the drawings are not necessarily shown to scale with one another.

In the drawings, unless stated otherwise, like, functionally equivalent and identically acting elements, features and components are provided with like reference numerals.

DETAILED DESCRIPTION

FIG. 1 is a plan view of a portion of a device 1 for producing a curved fiber preform when bent.

This is a device 1 for producing a curved fiber preform from a bi- or multidirectional fiber semi-finished product (not shown here) for a fuselage component of an aircraft or spacecraft, for example a former portion.

The device 1 comprises a plurality of first lamellae 2 and a plurality of second lamellae 3, which are configured to be pluggable into one another criss-cross in such a way that they are positioned on a shared plane and thus together form a grid 4. An axis 5, which intersects the shared plane of the grid 4 and about which the lamellae 2, 3 are resiliently bent, is further illustrated schematically. In this way, the local orientation of the lamellae 2, 3 deforms continuously, in such a way that the cells of the grid 4, which are square when detensioned, recognisably change to stretched or compressed rhombuses.

A fiber semi-finished product 9, not shown here, can be adhered temporarily on the grid 4 by an adhesion device or structure 6, here formed by way of example as an adhesive coating of the lamellae. The adhesion device or structure 6 is configured in such a way that the local fiber orientation of the fiber semi-finished product also changes accordingly when the lamellae 2, 3 bend. A corresponding coefficient of friction is therefore provided between the grid and the adhesion device or structure 6.

Purely by way of example, the adhesive coating shown here is an adhesive strip permitted for fiber materials. For example, the adhesive strip is formed to be thermally resistant.

In further embodiments, however, the adhesion device or structure 6 may have additional elements and/or measures for adhering the fiber semi-finished product, which are discussed in greater detail in reference to the following embodiments. In this case, an adhesive strip permitted for fiber materials may also be provided as an anti-adhesive coating so as to reduce the friction and/or as a contact face so as to provide reliable contact.

The deformation or shaping of the fiber semi-finished product 9 using a device 1 of this type is performed by a carrier, which comprises the grid 4 which is formed using the lamellae 2, 3 plugged into one another in the form of shearable bars plugged into one another. The bars may have the same orientation (for example ±45°) as the fiber orientation of at least some of the layers of the fiber semi-finished product 9 to be shaped. The fiber semi-finished product is therefore applied before the deformation in a fiber orientation corresponding to the orientation of the lamellae.

If the grid together with the fiber semi-finished product adhering thereto is sheared by bending, the fiber semi-finished product is also sheared together. By stops, the maximum deformation/shearing of the grid 4 and thus also the desired curved shape, for example a required curvature of a former shape, can also be established.

Figure 2:
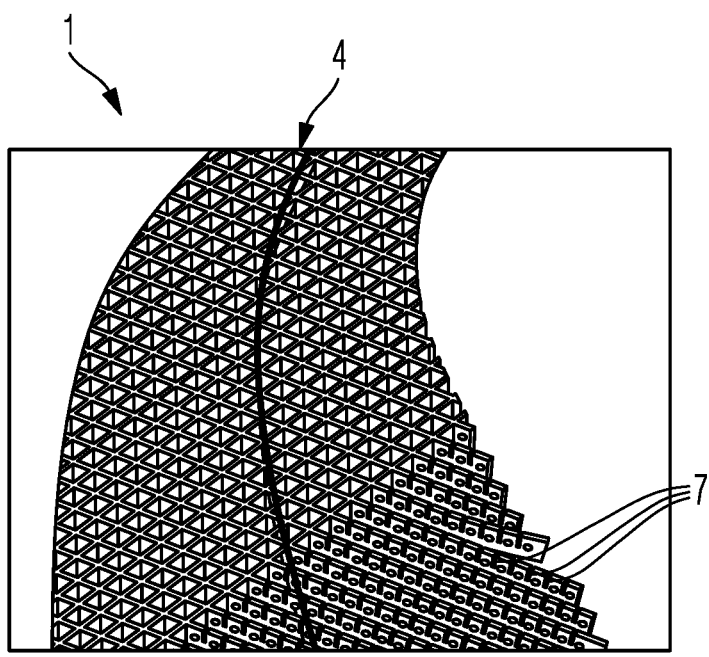
FIG. 2 is a perspective view of a device according to FIG. 1.

FIG. 2 is a perspective view of the device according to FIG. 1.

This drawing likewise shows a bent state of the grid 4, which can be seen clearly here.

Further, FIG. 2 shows plug sockets 7 of the first and second lamellae 2, 3, which combine to form a depth corresponding to a thickness of the first and/or second lamellae 2, 3. These are slits which extend transverse to the longitudinal direction of the lamellae and which extend from a longitudinal face in each case approximately as far as the centre of a lamella 2, 3. In this context, the plug sockets of the first and second lamellae are formed with opposite orientations in each case, in such a way that they can be plugged into one another. At the base of a slit, a detensioning hole is provided in each case.

Figure 3:
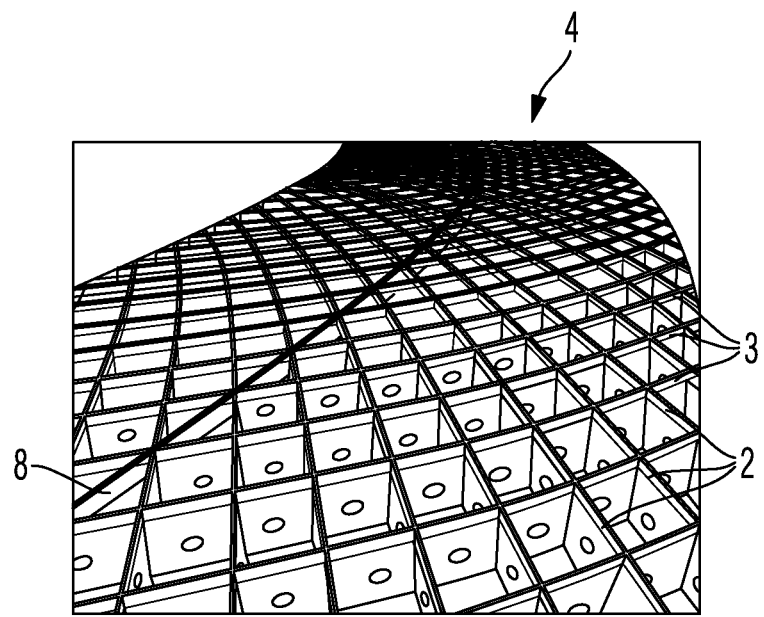
FIG. 3 is a further perspective view of the device of FIG. 2.

FIG. 3 is a further perspective view of a device according to FIGS. 1 and 2.

The device can be seen to comprise a plurality of first and second lamellae 2, 3. These are oriented in a ±45° orientation. For example, the lamellae may each be a flexible bar. As the material, a wide range of bendable materials are suitable, such as high-grade steel, spring steel, glass-fiber-reinforced plastics material, carbon-fiber-reinforced plastics material, thermoplastics or the like. By way of example, in the embodiment shown over 100 lamellae, which are highly flexible, are plugged into one another. The resulting grid is planar on both sides.

In the grid 4, a neutral lamella 8 in the form of an individual bar is introduced in a third direction, and has a 0° orientation. The neutral lamella 8 is likewise formed using plug sockets, the lamellae 2, 3 of the grid 4 likewise being formed with additional plug sockets for receiving the neutral lamella 8.

The neutral lamella 8 defines a neutral fiber of the deformation, in other words a line along which no shear deformation takes place. This may apply equally to the deformation of the grid 4 and of the fiber semi-finished product 9. Cells of the grid 4 which are positioned on a first side of the neutral lamella 8 are thus stretched when the lamellae 2, 3 bend, whilst cells of the grid positioned on a second side of the neutral lamella 8 are compressed.

The fiber semi-finished product 9 can be sucked onto the grid 4 when an underpressure is applied by holes or ducts in the grid. For this purpose, in this embodiment the cells formed by the lamellae 2, 3 are fluidically connected via additional holes arranged between the plug sockets so as to make air circulation or pressure compensation possible between the cells.

Figure 4:
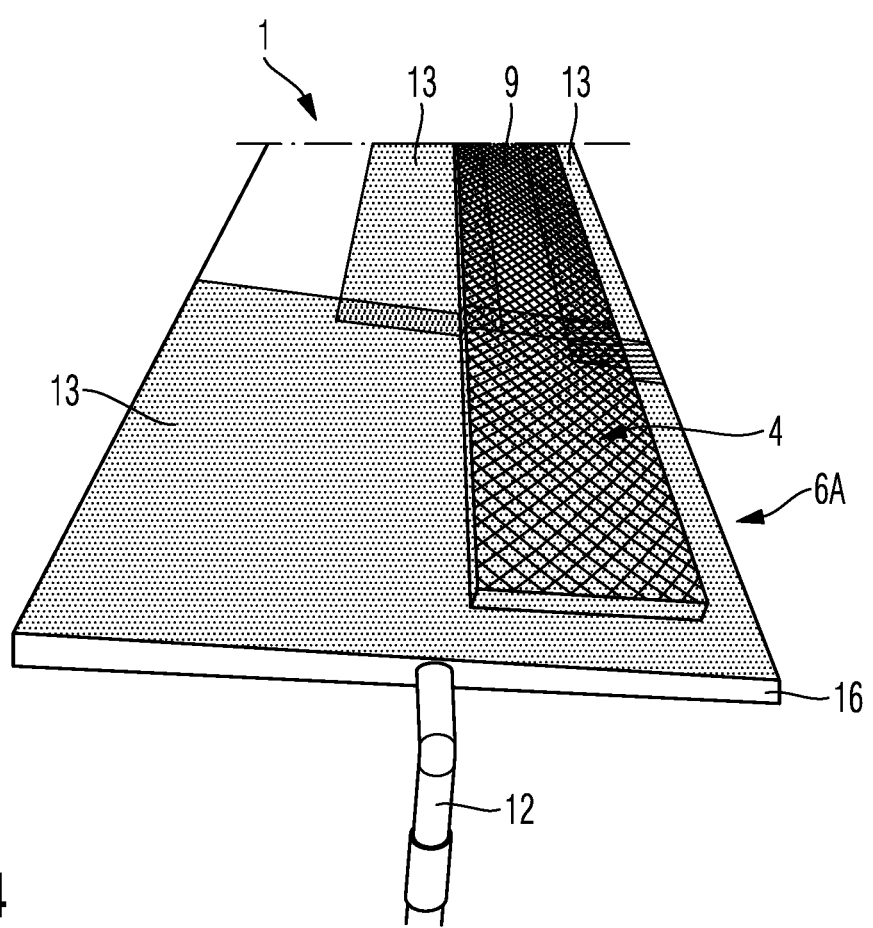
FIG. 4 is a perspective drawing of a portion of a device for producing a curved fiber preform in accordance with a further embodiment.
Figure 5:
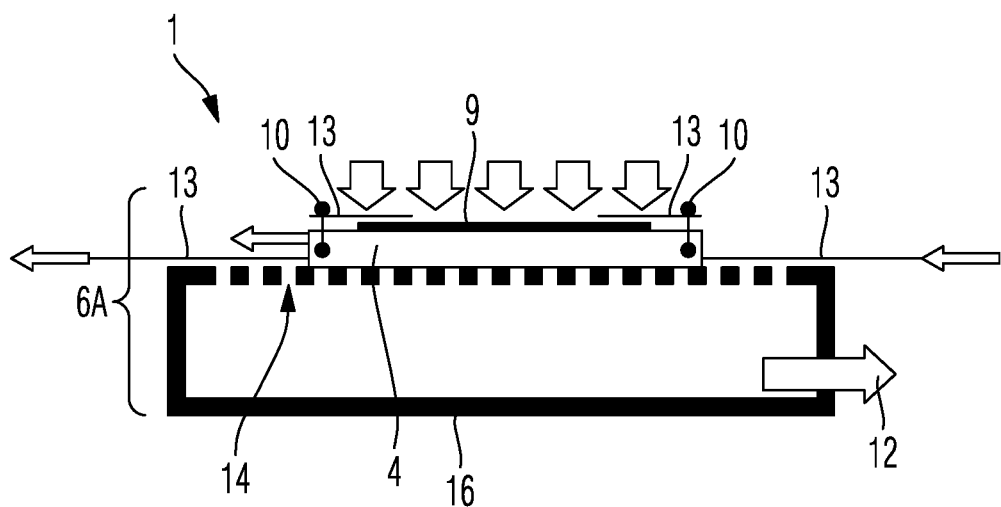
FIG. 5 is a schematic cross-sectional drawing of the device of FIG. 4.

FIG. 4 is a perspective drawing of a portion of a device for producing a curved fiber preform in accordance with a further embodiment. FIG. 5 is a schematic cross-sectional drawing of the device of FIG. 4.

In this embodiment, the device 1 also has a grid 4 as explained in reference to FIGS. 1 through 3.

However, the adhesion device or structure 6A of this embodiment additionally comprises a hollow box which is arranged under the grid and which is formed as an underpressure box 16. Sealing 13 for sealing regions without fiber semi-finished product support is further provided.

For applying underpressure to the grid 4, a connection 12 to an underpressure source, for example for connecting a vacuum cleaner tube as shown in FIG. 4, is provided on a side face of the underpressure box 16.

On the upper face of the underpressure box 16, a perforation 14 as shown in FIG. 5 is provided in the form of an arrangement of holes, through which an underpressure applied to the underpressure box 16 can be transmitted into the grid 4. Via cells which are not covered by the semi-finished product 9 and holes of the perforation 14 which are not in contact with the grid 4, sealing 13 formed as a covering are applied. Further additional sealing 13 is further provided on the edge of the fiber semi-finished product 9, for sealing lateral cells of the grid 4 which are not covered by the semi-finished product, and fixed to the grid 4 using suitable fixing structure or device 10.

In this way, the fiber semi-finished product 9 placed on the grid 4 is sucked onto the grid 4, as is symbolised by the perpendicular thick arrows in FIG. 5, in such a way that static friction occurs between the fiber semi-finished product 9 and the lateral flanks of the lamellae 2, 3, and adhesion of the fiber semi-finished product 9 to the grid 4 thus occurs.

Figure 6:
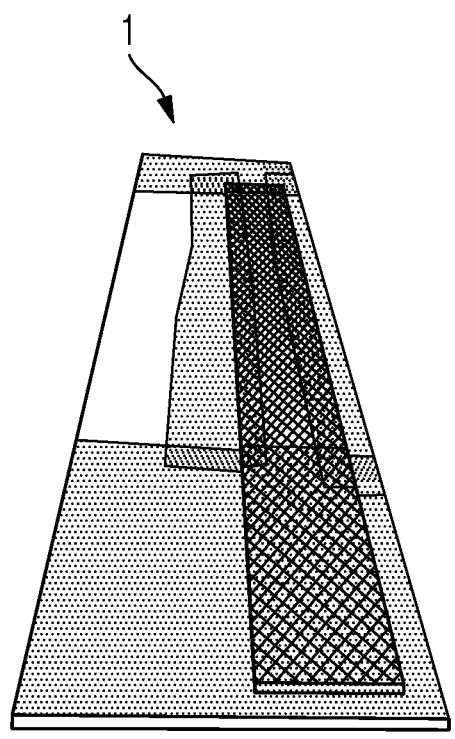
FIG. 6 is a perspective view of the device of FIGS. 4 and 5 when detensioned.
Figure 7:
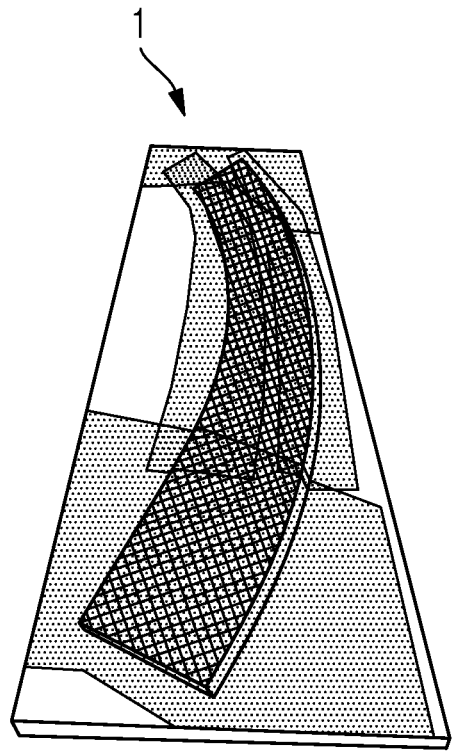
FIG. 7 shows the device of FIG. 6 when bent.

FIG. 6 is a perspective view of the device 1 of FIGS. 4 and 5 when detensioned, whilst FIG. 7 is a perspective view of the device 1 when bent.

As a result of the deformation of the grid during bending, the face covered by the grid 4 is also displaced on the underpressure box 16. Thus, there are holes of the perforation 14 of the underpressure box 16 which are only positioned below the grid 4 when detensioned as in FIG. 6 or at the start of the deformation, and which are positioned alongside the grid 4 when bent or at the end of the deformation. Conversely, there are also holes of the perforation which are positioned outside the grid 4 at the start of the deformation and are positioned under it at the end of the deformation.

For sealing the holes positioned alongside the grid 4 in each case, the perforation 14 is also covered by the covering in regions positioned alongside the grid. Otherwise, holes positioned outside the grid 4 would suck up false air and reduce the suction force available for the fiber semi-finished product 9 positioned on the grid 4. The covering provided as sealing 13 is accordingly formed so as to be displaced together with the deformation of the grid 4, as is indicated in FIG. 5 by the horizontal smaller arrows.

Since the shape and the lengths of the outer edges of the grid 4 change during bending, the covering is further formed flexibly, in this case for example in the form of a flexible film. Further, in this case the covering consists of or comprises for example a plurality of sub-pieces which are displaceable with respect to one another.

Figure 8:
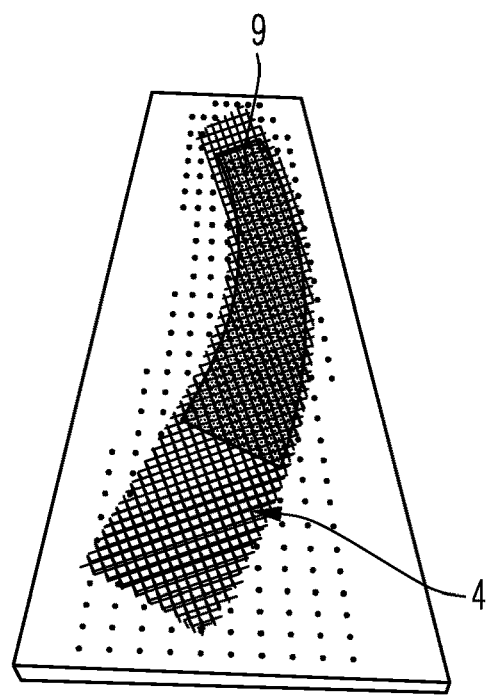
FIG. 8 is a drawing of a step of applying a fiber preform to the grid for the device of FIG. 4 through 7.
Figure 9:
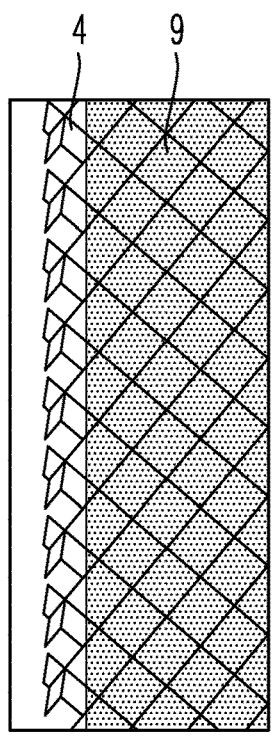
FIG. 9 is a detail of the edge of the fiber semi-finished product of FIG. 8 applied to the grid.

FIG. 8 is a drawing of a step of applying a fiber preform 9 to the grid 4 in the device of FIGS. 4 to 6. FIG. 9 is a detail of the edge of the fiber semi-finished product of FIG. 8 applied to the grid 4.

It can be seen that at the edge of the fiber semi-finished product there are cells of the grid 4 which are merely covered in part. For these regions, in the embodiment shown an additional sealing 13 is provided, which is shown in FIG. 10.

Figure 10:
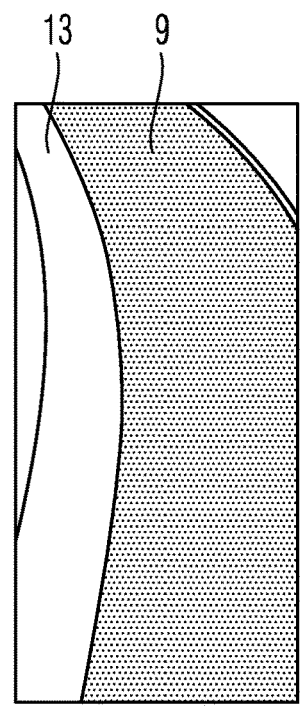
FIG. 10 shows the fiber semi-finished product of FIGS. 8 and 9 with an edge covered with additional sealing.

FIG. 10 shows the fiber semi-finished product 9 of FIGS. 8 and 9 with an edge covered with additional sealing 13.

The additional sealing 13 serve to prevent false air from being sucked up at the edge of the grid 4, in particular in the gap shown in FIG. 9 between the straight end of the fiber semi-finished product 9 and the jagged edge of the grid 4 to which underpressure is applied. This additional sealing 13 is likewise formed as a covering, but unlike the film of FIG. 4 is formed as a resilient plastics material mat in this case by way of example. The additional sealing 13 may be positioned at the edge of the grid 4, as shown here, or else also be positioned on further portions of the grid 4 in further embodiments. Accordingly, the additional sealing 13 may also be a flexible or multi-part covering.

Figure 11:
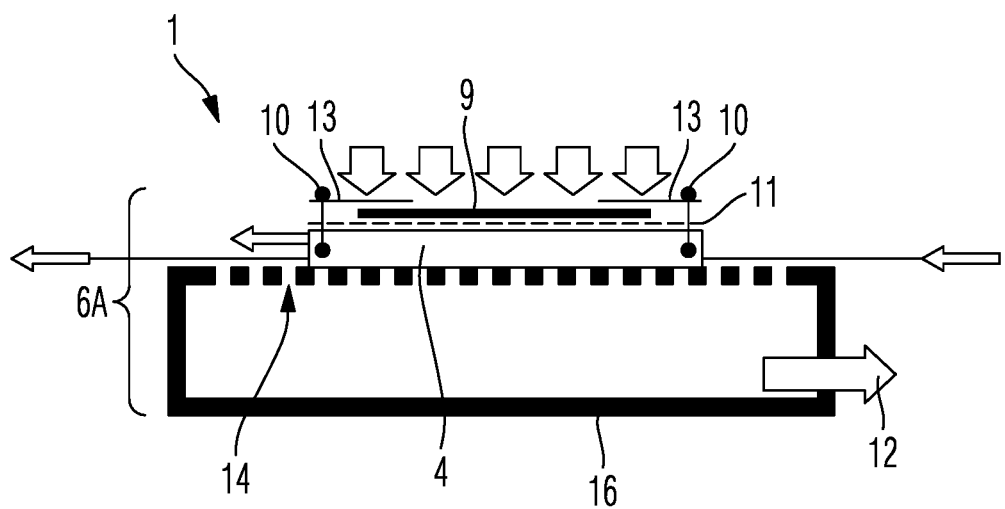
FIG. 11 is a schematic cross-sectional view of a device for producing a curved fiber preform in accordance with a further embodiment.

FIG. 11 is a schematic cross-sectional view of a device 1 for producing a curved fiber preform in accordance with a further embodiment.

This embodiment differs from the embodiments described previously in relation to FIGS. 4 through 11 by way of an additional membrane 11, which is provided between the grid 4 and the fiber preforms 9.

In this embodiment, which is based on suction by way of underpressure, the membrane 11 is formed air-permeable and deformable. It serves to brace the fiber semi-finished product in compressed regions of the grid, so as to prevent local swelling into grid gaps, in other words into cavities of the individual cells.

Figure 12:
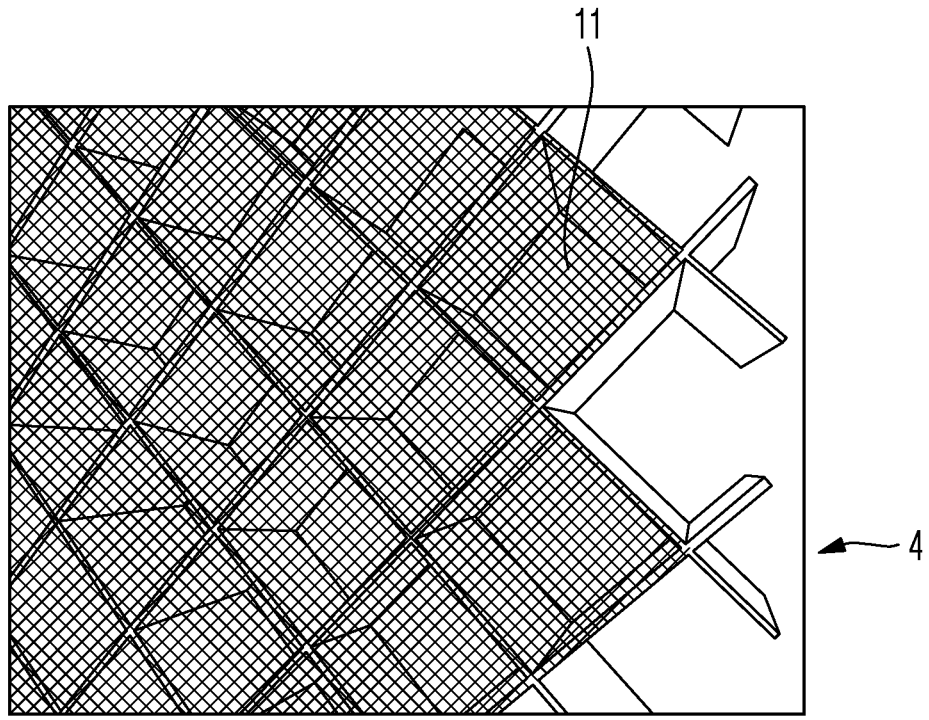
FIG. 12 is a detail of a membrane applied to the grid of the device.

FIG. 12 is a detail of an embodiment of a membrane 11 applied to the grid 4 of the device 1.

In this case the membrane 11 is formed as a metal grid by way of example. The threads of the metal grid have an identical orientation to the lamellae 2, 3 of the grid 4.

By the additional metal grid, the fiber semi-finished product 9 is braced from below in the grid gaps. Since the threads of the metal grid extend in the lamellae direction, the metal grid and thus also the lamellar grid 4 still remain deformable, however.

In other embodiments, however, instead of a metal grid a rubber membrane, for example perforated or slitted, may be used. For example, this is biased in accordance with a predetermined curvature of the fiber preform to be produced, so as to compensate the deformation of the grid 4 without swellings. The rubber membrane would subsequently have to be tensioned onto the grid 4 in such a way that the deformation of the rubber membrane is defined by the grid and thus subsequently also corresponds to the deformation of the textile (in other words not to the natural deformation of rubber).

In a further embodiment, instead of a membrane 11 of this type it is also conceivable to make the grid 4 itself narrower-mesh, in other words from much smaller lamellae, in such a way that the grid 4 has smaller cells or smaller gaps and the fiber semi-finished product 9 is thus better supported.

Figure 13:
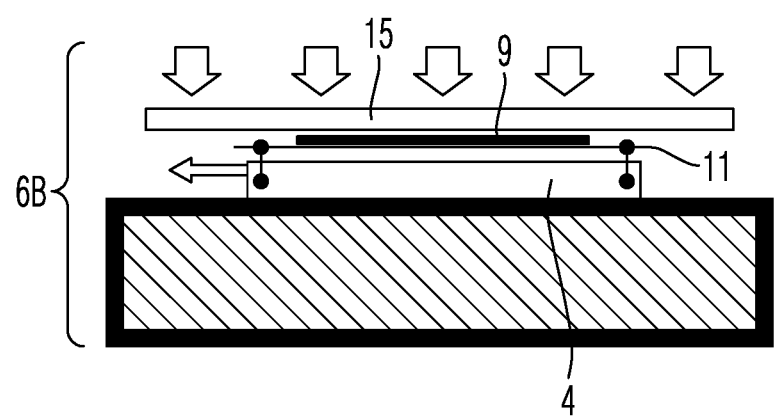
FIG. 13 is a schematic cross-sectional view of a device for producing a curved fiber preform in accordance with another further embodiment.

FIG. 13 is a schematic cross-sectional view of a device 1 for producing a curved fiber preform in accordance with another further embodiment.

The distinguishing adhesion device or structure 6B of this embodiment comprises a planar bed, which supports the grid, and has a contact face 15, which contacts the fiber semi-finished product 9 on a side opposite the grid 4.

The contact face 15 is for example formed as a stamp which covers the size of the grid in both states, which is for example in the form of a solid body plate, and which has an anti-adhesive coating. In this way, a coefficient of friction between the contact face 15 and the fiber semi-finished product 9 is less than a coefficient of friction between the grid 4 and the fiber semi-finished product 9. When mechanical pressure, symbolised by vertical arrows in FIG. 13, is applied via the contact face 15, static friction is thus built up between the grid 4 and the fiber semi-finished product 9. The deformation under mechanical pressure applied using the stamp can therefore be performed in the same manner described in relation to the preceding embodiments with application of underpressure.

Further, in this case a membrane 11 for supporting the fiber semi-finished product 9 on the grid 4 may optionally also be provided. For example, in this case an (optionally biased) rubber membrane is used, but this does not need to be perforated.

By a device in accordance with one of the above-described embodiments, in particular fiber preforms for C profiles for formers can be produced, for example for producing 90° portions of a former. Accordingly, the produced fiber preform may subsequently be processed further to form the desired component, for example by cutting away edge regions, optionally by further shaping to form the subsequent component shape. For example, this may include collaring the flange of the C profile for a former portion.

Although the disclosure herein has been described entirely by way of several embodiments in the above, it is not limited thereto, but can be modified in various ways.

For example, a fiber semi-finished product may also be heated while positioned on the bent grid 4 so as to activate a binder which is located in the textile of the fiber semi-finished product and which fixes the deformation. In this case, after cooling, the curved fiber preform can subsequently be received by a conventional gripper and transported onwards and/or processed further.

A further conceivable embodiment of the device in the context of the disclosure herein is a simultaneous formation of the device as an end effector. For this purpose, the device 1 is for example rotated together with the suction substructure of an adhesion device or structure 6A, in other words together with the underpressure box 16 and the sealing 13, after deformation together with the curved fiber preform. The fiber preform is subsequently transported onwards, for example directly positioned on a further component preform, by the end effector formed integrally with the device. Therefore, in this embodiment, the curved fiber preform may also only be heated once it is on the component preform, in such a way that the shape of the fiber preform is fixed simultaneously with fixing on the component preform. For example, the component preform may be in the form of already deposited but not yet connected further layers for the component which is to be produced.

If elastomer or rubber membranes are used on the grid 4, either below or above the fiber semi-finished product 9, a further embodiment may involve applying this membrane biased only in part or in portions to the grid. As a result of the different deformation of the grid and of the material of the membrane, for example rubber, the grid 4 is prevented from shortening on the radially inner side in the longitudinal direction, for example on the inside of the bending in the direction of the inner flange of a former preform. The membrane is thus compressed and can buckle in the absence of bias. As a result of the membrane being biased, it instead always remains planar, in such a way that buckling is prevented and the fiber semi-finished product is always optimally supported.

In one embodiment, the bias of the rubber membrane can be provided in such a way that on the inner side of the curvature the tension is at a maximum at the start of the deformation and is near-zero when the end state of the deformation is reached. On the outside of the curvature, the bias may accordingly be provided the other way around, in such a way that there it is near-zero at the start of the deformation and becomes a maximum when the end state of the deformation is achieved.

In a further embodiment, however, the bias of the membrane may also be provided to be exactly as great on the outside as on the inside, in such a way that when the grid is non-deformed or relaxed it also remains straight in the absence of external forces.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for producing a curved fiber preform from a bi-directional or multidirectional fiber semi-finished product, the device comprising:
    a plurality of first lamellae;
    a plurality of second lamellae, which are coupled to the plurality of the first lamellae in a criss-cross pattern, such that the first and second lamellae are positioned on a shared plane and form a grid having a plurality of cells defined by intersections of the first and second lamellae, wherein the first and second lamellae at least in part are formed resiliently bendable about an axis intersecting the shared plane, such that a local orientation of the first and second lamellae in the grid is changeable;
    an adhesion structure, which is configured for temporarily adhering the fiber semi-finished product to the grid formed by the lamellae, such that a local fiber orientation of the fiber semi-finished product changes accordingly when the local orientation of the first and second lamellae in the grid change due to bending of the lamellae; and
    a neutral lamella, which is introduced into the grid at an angle that is different from an angle of orientation within the grid of the first lamellae and an angle of orientation within the grid of the second lamellae, wherein the neutral lamella is arranged in a region of a theoretical or actual neutral fiber of the curved fiber preform being produced, and wherein the neutral lamella is formed such that:
        a first portion of the cells of the grid, which are positioned on a first side of the neutral lamella, are stretched during bending of the first and second lamellae;
        a second portion of the cells of the grid, which are positioned on a second side of the neutral lamella, are compressed during bending of the first and second lamellae; and cells of the grid that are positioned directly on the neutral lamella are only insignificantly deformed.

2. The device of claim 1, wherein the first and second lamellae comprise corresponding plug sockets, which can be plugged into one another for coupling the first and second lamellae together to form the grid.

3. The device of claim 2, wherein corresponding plug sockets are combined and form a depth corresponding to a thickness of at least one of the first and second lamellae.

4. The device of claim 1, wherein:
the curved fiber preform is for a fuselage component of an aircraft or spacecraft; and/or
the first and second lamellae each comprise holes, which are formed through a thickness thereof and are positioned between points where the first and second lamellae intersect each other to form the cells of the grid, the holes being formed to fluidically interconnect the cells of the grid to allow for air circulation and/or pressure compensation between the cells of the grid.

5. The device of claim 1, wherein a deformable membrane provided as a support face for the fiber semi-finished product is provided on the grid.

6. The device of claim 5, wherein the deformable membrane is a resiliently biased membrane for compensating bending of the lamellae.

7. The device of claim 1, wherein the adhesion structure comprises an underpressure box, which fluidically contacts the grid and is configured to generate an underpressure in each cell of the grid.

8. The device of claim 7, wherein the underpressure can be applied by an underpressure connection, which is provided on the underpressure box and to which an underpressure source can be connected.

9. The device of claim 7, wherein the underpressure box comprises an upper face, which is perforated to form a perforation which is in a form of an arrangement of holes, wherein the upper face is in contact with a side of the grid that is opposite a side of the grid on which the adhesive coating is provided, such that the underpressure applied to the underpressure box can be transmitted into the grid, the device comprising:
a sealing, which is formed as a covering and is applied over, so as to seal against, cells of the grid that are not covered by the fiber semi-finished product, holes of the upper face of the underpressure box that are not in contact with the grid, and in edge regions of the fiber semi-finished product, such that the underpressure is present substantially at the fiber semi-finished product.

10. The device of claim 9, wherein the perforation is provided in a first region, where the cells of the grid provided for supporting the fiber semi-finished product are located when the lamellae are detensioned, and in a second region, where the cells of the grid which are provided for supporting the fiber semi-finished product are located when the lamellae are bent.

11. The device of claim 9, wherein the sealing seals the perforation which is positioned alongside the cells of the grid which are provided for supporting the fiber semi-finished product in each state of the grid.

12. The device of claim 11, wherein the sealing has at least one of an air-impermeable local covering and selectively actuable valves of at least one of the perforation and the grid.

13. The device of claim 1, wherein the adhesion structure comprises:
an adhesive coating formed on the lamellae, wherein the adhesive coating is configured to temporarily adhere the fiber semi-finished product to the grid formed by the lamellae, such that a local fiber orientation of the fiber semi-finished product changes accordingly when the local orientation of the lamellae in the grid change due to bending of the lamellae; and
an underpressure box, which fluidically contacts the grid and is configured to generate an underpressure in each cell of the grid to suck the fiber semi-finished product onto the grid at the adhesive coating.

14. The device of claim 13, wherein the adhesion structure comprises at least one of an adhesive coating or rough, jagged, and/or needle portions in an application region of the grid.

15. The device of claim 14, wherein the application region of the grid is at an edge of the fiber semi-finished product.

16. The device of claim 1, wherein the adhesion structure has a contact face which contacts the fiber semi-finished product on a side opposite the grid, a coefficient of friction between the contact face and the fiber semi-finished product being configured to be less than a coefficient of friction between the grid and the semi-finished product.

17. The device of claim 1, wherein at least one of the grid and the adhesion structure are formed as part of an end effector for transporting the previously curved fiber preform when the lamellae are bent.

18. A method for producing a curved fiber preform, comprising:
applying a bi-directional or multidirectional fiber semi-finished product to a grid, which is formed by coupling a plurality of first lamellae to a plurality of second lamellae in a criss-cross pattern, such that the first and second lamellae are positioned on a shared plane and define a plurality of cells within the grid by intersections of the first and second lamellae, wherein the fiber semi-finished product is oriented on the grid such that the bi- or multidirectional fibers of the fiber semi-finished product at least in part extend parallel to at least one of the lamellae;
introducing a neutral lamella into the grid at an angle that is different from an angle of orientation within the grid of the first lamellae and an angle of orientation within the grid of the second lamellae, wherein the neutral lamella is arranged in a region of a theoretical or actual neutral fiber of the curved fiber preform being produced;
temporarily adhering the fiber semi-finished product to the grid; and
resiliently bending the first and second lamellae, at least in part, about an axis intersecting the shared plane to change a local orientation of the first and second lamellae in the grid, wherein a local fiber orientation of the fiber semi-finished product changes accordingly when the local orientation of the first and second lamellae in the grid change due to bending of the lamellae;
wherein the neutral lamella is formed such that, during the resilient bending of the first and second lamellae, fibers positioned on the first side of the neutral lamella deform in accordance with a stretching of the cells of the grid positioned on the first side of the neutral lamella, fibers positioned on a second side of the neutral lamella deform in accordance with a compression of the cells of the grid positioned on the second side of the neutral lamella, and cells of the grid that are positioned directly on the neutral lamella are only insignificantly deformed.

19. The method of claim 18, wherein:
the temporary adhesion is provided by mechanical pressure acting on the fiber semi-finished product or fluidic underpressure acting on the fiber semi-finished product; and/or
the first and second lamellae each comprise holes, which are formed through a thickness thereof and are positioned between points where the first and second lamellae intersect each other to form the cells of the grid, the holes being formed to fluidically interconnect the cells of the grid to allow for air circulation and/or pressure compensation between the cells of the grid.

20. The method of claim 18, comprising transporting the curved fiber preform by at least one of the grid when the lamellae are bent and an adhesion structure used for adhesion is provided.

\* \* \* \* \*